United States Patent [19]

Schechter

[11] Patent Number: 6,013,292

[45] Date of Patent: Jan. 11, 2000

[54] LOW FAT FOOD PRODUCT

[75] Inventor: Steven M. Schechter, Manalpan, N.J.

[73] Assignee: Superior Nutrition Corporation, N.J.

[21] Appl. No.: 09/110,791

[22] Filed: Jul. 6, 1998

[51] Int. Cl.[7] .................................. A23L 1/212; A23B 7/16
[52] U.S. Cl. .............................. 426/94; 426/96; 426/102; 426/293
[58] Field of Search .................................. 426/89, 96, 102, 426/273, 289, 293, 296, 302, 619, 443, 469, 466, 473, 518, 520, 523, 94

[56] References Cited

U.S. PATENT DOCUMENTS

| | | | |
|---|---|---|---|
| 3,656,969 | 4/1972 | Horn | 99/100 |
| 4,351,850 | 9/1982 | Costamagna et al. | 426/302 |
| 5,595,777 | 1/1997 | Chalupa et al. | 426/305 |
| 5,770,252 | 6/1998 | McEwen et al. | 426/292 |

FOREIGN PATENT DOCUMENTS

| | | |
|---|---|---|
| 824944 | 5/1981 | U.S.S.R. . |
| 2 097 646 | 11/1982 | United Kingdom . |
| WO 9740710 A1 | 11/1997 | WIPO . |

OTHER PUBLICATIONS

Abstracted Publication Number: RD 350081 A Derwent Publication, Jun. 10, 1993.

*Primary Examiner*—David Lacey
*Assistant Examiner*—Drew Becker
*Attorney, Agent, or Firm*—Hedman, Gibson & Costigan, P.C.

[57] ABSTRACT

A baked reduced fat battered and breaded vegetable product is described which is based on a dried or dehydrated vegetable substrate which is coated with a fat and oil free batter as a first inner layer which directly coats the dried or dehydrated vegetable and a breading mixture that is an outer layer on the fat and oil free batter. The drying profile is critical to obtaining an optimum texture and taste.

2 Claims, No Drawings

LOW FAT FOOD PRODUCT

BACKGROUND OF THE INVENTION

The present invention relates to low fat vegetable food product which substantially retain the taste and texture of battered and fried foods.

Battered and fried vegetables such as fried onions, zucchini, broccoli and other vegetables are used as snacks or accent foods because of their distinct flavor and texture. Fried onions for example are used in casserole dishes, on top of burgers or as sides dishes.

While these fried products have excellent taste and appeal to many consumers, the emerging concern of many consumers regarding the consumptions of excessive amounts of fat restricts the number of consumers who will enjoy battered and fried vegetables. For example, a single seven (7) gram serving of French's Real Fried Onions contains three and a half grams (3.5) of fat which means that the calorie content of one serving provides 75% of the calories from the fat content of the product.

The applicant has discovered a process of making a low fat food product that is more than 95% fat free but still has acceptable taste and texture. In addition, the new product may have additional flavors added to the batter, the breading or the food, before or after drying by the use of flavors or spices which would have been destroyed or altered by traditional deep fat frying processes.

SUMMARY OF THE INVENTION

The invention is based on the use of a fat and oil free batter, a breading formula that contains not more than 5% of vegetable oil, by weight, which are applied to a dehydrated vegetable product followed by baking and drying cycles that use temperatures below about 400° F. coupled with high velocity air drying, such as convective air drying.

Accordingly it is a primary object of this invention to provide a low fat vegetable food product which has excellent taste and texture.

It is also an object of this invention to provide a process of making a low fat vegetable food product which has excellent taste and texture.

It is also an object of this invention to provide a low fat vegetable food product which has excellent shelf storage characteristics under ambient conditions.

These and other objects of the invention will become apparent from the present specification.

DETAILED DESCRIPTION OF THE INVENTION

The invention is directed to the preparation of low fat vegetable food products that have an inner batter layer and an outer breaded layer. The dried or dehydrated vegetables that may be used in the practice of the invention include but are not limited to edible plant parts of the allium genus which include all varieties of onions, (e.g. Texas, Vandelia, Bermuda, Yellow and the like) scallions, shallots, garlic and the like; different varieties of squash such as zucchini; different varieties of broccoli; eggplant; cucumbers and the like. Other vegetables which are chewable when in dehydrated form may be employed in the practice of the invention.

The vegetable may be blanched or dried prior to being coated with the batter. Generally the dried or dehydrated vegetable will have from 2 to 10 wt %, and preferably 4 to 8 wt % and most preferably about 5 wt % of water based on the total weight of the dried vegetable product. The preferred manner of preparation is to slice or dice the vegetables into about one-eighth to one-half inch slices or diced sections. Larger or smaller sections may be used depending on the particular vegetable.

The batter is based on a water based mixture of wheat flour, starch, dough conditioners and a leavening agent. The wheat flour may be a bleached or unbleached general purpose baking flour or durum flour. The leavening agent may be based on the use of yeast, baking powder, baking soda, air or the like. The starch may be a corn, potato, rice or a mixture of one or more of such starches. The dough conditioners may comprise one or more of agents such as sodium acid pyrophosphate, mono-calcium phosphate or like. If desired, salt or spaces may also be added. A sufficient amount of batter is used which will provide a coating of 0.01" to 0.2" or a weight of about 30 to 60%. A typical batter formula may comprise in weight percent:

| | |
|---|---|
| Wheat flour | 50% to 90% |
| Starch | 2% to 10% |
| Spices | 0% to 5% |
| Leavening agent | 0% to 5% |
| Dough conditioners | 0% to 10% |
| Flavor | 0% to 10% |
| Water | 50% to 10% |

The breading may be applied from a mixture comprising wheat flour based bread crumbs which may be dried or toasted, a sugar such as sucrose or dextrose, a vegetable oil, such as corn oil, safflower oil, canola oil, soybean oil and the like and optionally salt, spices, flavors and yeast. Stabilizers such as BHT or BHA or calcium propionate may be added as desired. A sufficient amount of breading is used which will provide a coating of 0.01" to 0.1" or a weight of about 20 to 50%. A typical breading mixture may comprise in weight percent:

| | |
|---|---|
| Wheat bread crumbs | 50% to 90% |
| Sugar | 0% to 5% |
| Vegetable oil | 0% to 5% |
| Salt | 0% to 10% |
| Spices | 0% to 10% |
| Flavor | 0% to 10% |

Flavors may comprise prepared hot and spicy flavor concentrates which are commercially available such as Cajun, cheese, jalopena pepper, Nacho cheese, salsa and the like.

The batter should be made with a sufficient amount of water to make the batter flow and coat the particular vegetable with a thin adherent coating of the batter at room temperature. The thickness of the batter coating may vary but it should be from about 1/32" to 1/8" in thickness. If desired a thinner or thicker coating may be applied. The outer breaded layer may be applied at the same amount and under the same conditions as the inner batter layer.

After the breaded layer is applied, the coated vegetable is baked in an oven at a temperature not in excess of about 400° F. and preferably in the range of about 180° to 400° F. in a moderate to high air velocity oven which provides a convective air flow. Preferably, the oven is provided with a porous or wire mesh baking surface such as a Proctor and Schwartz oven at an air velocity flow rate of about 200–2000 feet/minute until the baked vegetable is dried to a water level of less than 0.6 Aw (Aw is a measure of bound water activity determined in an Aqualab CX2 in accordance with the procedure described by Decagon Devices, Pullman, Wash.), more preferably about 0.4 Aw., and especially preferably less than 0.2 Aw. A Hobart rack oven with perforated trays having ⅛" diameter round holes may be employed. The thickness of the layer of vegetables on the tray in the oven should be limited to less than ¼" . The drying may be also be carried out in an air dryer, a microwave oven, a dielectric oven or an infrared apparatus. A Wolverine Jetzone dryer may be used at a temperature of about between 200 to 400° F. and preferably at a temperature of about 300 to 400° F. with an air velocity range of about 2,000 to 10,000 feet/minute, preferably about 6,500 feet/minute.

EXAMPLE

Ten (10) pounds of dried, sliced onion pieces having an average size of ⅛" to ¼" were obtained from Rogers Foods. The following batter was prepared:

| Flour (wheat) | 73% |
| Starch (modified wheat) | 10% |
| Salt | 10% |
| Sod. acid pyrophosphate | 2% |
| Sodium bicarbonate | 3% |
| Mono Cal. phosphate | 2% |

The batter mix is prepared by mixing 1 part by weight of batter with 2 parts by weight of water in a one gallon mixer, Hobart Model K45-SS, Hobart Manufacturing Co., Inc. Troy, N.Y., for three (3) minutes to prepare a smooth batter. A sufficient amount of batter is applied to the onions to coat the onions with a batter coating which is about 0.05" thick or is about 50% by weight of the total weight of onions and batter. A breading mixture is prepared from the following ingredients:

| Wheat bread crumbs | 78% |
| Dextrose | 10% |
| Vegetable oil (corn) | 2% |
| Salt | 10% |

A sufficient amount of breading mixture is applied to the dried onions to coat the onions with a coating which is about 0.03" thick or is about 30% by weight of the total weight of battered and breaded onions.

The battered and breaded onions are baked in high velocity Hobart rack oven at about 200° F. for about 30 minutes until dry with a water activity of less than 0.2 Aw. The drying may also be carried out in a high velocity air dryer such as a Wolverine Jetzone oven with a temperature of about 350° F. for six (6) minutes. High velocity air drying is preferred because it produces a superior vegetable texture as the surface of the coated vegetable becomes slightly puffed during drying. The drying step is critical to obtaining an optimum texture and taste.

The baked onions are 95+% fat free but have about the same taste and texture of batter fried onions. The low fat content will make possible an extended shelf life for these products and the low cooking temperatures will make possible the use of and retention of flavors which would be affected by the use of a deep fat frying process.

While certain preferred and alternative embodiments of the invention have been set forth for purposes of disclosing the invention, modifications to the disclosed embodiments may occur to those who are skilled in the art. Accordingly, the appended claims are intended to cover all embodiments of the invention and modifications thereof which do not depart from the spirit and scope of the invention.

I claim:

1. A baked reduced fat battered and breaded vegetable product which consists essentially of:
   (a) a dried vegetable substrate;
   (b) a fat and oil free batter which is an inner layer which directly coats said vegetable substrate and consists essentially of:

| wheat flour | 50% to 90% |
| starch | 2% to 10% |
| spices | 0% to 5% |
| dough conditioners | 0% to 10% |
| flavor | 0% to 10% |
| water | 50% to 10%; |

(c) a breading mixture that is an outer layer on said fat and oil free batter.

2. A baked reduced fat battered and breaded dried vegetable product as defined in claim 1 wherein the vegetable is an onion.

* * * * *